United States Patent

[11] 3,632,477

[72] Inventors: Merfyn Richards, Dorking; Jeffery Edward Munden, Horsham, both of England
[21] Appl. No.: 870,977
[22] Filed: Sept. 24, 1969
[45] Patented: Jan. 4, 1972
[73] Assignee: Beecham Group Limited, Middlesex, England
[32] Priority: May 25, 1966
[33] Great Britain
[31] 23,329/66
Original application May 18, 1967, Ser. No. 639,286. Divided and this application Sept. 24, 1969, Ser. No. 870,977

[54] ANTIBIOTIC PRODUCTION USING A STRAIN OF ASPERGILLUS CANDIDUS
2 Claims, No Drawings

[52] U.S. Cl. .................................................. 195/81
[51] Int. Cl. .................................................. C12d 9/00
[50] Field of Search .................................... 195/80, 81

[56] References Cited
OTHER REFERENCES

Journal of the Chemical Society, Nov. 1958, pp. 4,576–4,581

*Primary Examiner*—Joseph M. Golian
*Attorney*—Jacobs & Jacobs

ABSTRACT: The antibiotic 3'-chloro 5:2' dihydroxy 3:7:8-trimethoxy flavone is produced by growing a strain of *Aspergillus candidus* ATCC 20022 or ATCC 20023 or a mutant thereof under aerobic conditions in an aqueous nutrient until the nutrient solution exhibits substantial antibiotic activity and thereafter isolating the antibiotic with a hydrocarbon solvent. The antibiotic has bactericidal and fungicidal properties.

ANTIBIOTIC PRODUCTION USING A STRAIN OF ASPERGILLUS CANDIDUS

This application is a division of application Ser. No. 639,286 filed May 18, 1967 which latter application was refiled as a continuation application Ser. No. 871,598 on Nov. 19, 1969.

This invention relates to a new antibiotic and to methods for the production thereof.

The antibiotic, which is a flavone derivative, is produced on the cultivation of certain strains of *Aspergillus candidus*, or mutants thereof e.g., *Aspergillus candidus* BRL 274 and BRL 716 (A.T.C.C. Nos. 20022 and 20023). It is highly active against certain bacteria and fungal species, including some species of *Aspergillus* causing mycotic diseases in man.

According to the present invention there is provided the antibiotic 3'-chloro 5:2' dihydroxy 3:7:8-trimethoxy flavone of the structural formula,

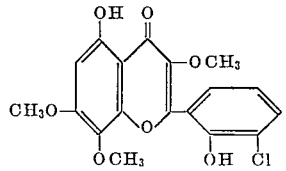

(I)

The antibiotic substance is produced by growing the *Aspergillus candidus* or mutant strain culture under aerobic conditions in an aqueous nutrient solution containing inorganic salts and a source of carbon and of nitrogen until the nutrient solution exhibits a substantial antibiotic activity whereupon the antibiotic is then isolated.

Fermentation

Cultures of the antibiotic-producing fungi are maintained in soil stocks and on standard agar slants on a suitable agar culture medium for example Oatmeal Agar or Beef Extract Agar. For inoculum the cultures are grown up on agar slants of a suitable growth medium such as sabouraud's dextrose agar or Beef Extract Agar in standard medical flat bottles for about 5 to 10 days at 20° to 30° C. To inoculate a fermentation broth spores are washed off a mature culture on an agar slant with sterile water which may contain 0.02 percent Tween 80 to assist wetting and dispersion of the spores. The resulting suspension of spores is transferred aseptically to Erlenmeyer flasks or small fermenters. The resulting growth may serve as the final fermentation process or it may be used as a vegetative seed stage to be used as inoculum for a larger volume of fermentation medium. In the same way, two or more vegetative seed stages may be employed. The amount of vegetative seed used as inoculum for the succeeding stage is preferably in the range 5 to 10 percent.

The seed and fermentation media both contain sources of nitrogen, sources of carbon and energy and suitable amounts of inorganic salts and other substances necessary for nutrition of the fungus.

Assimilable nitrogen sources which may be employed include inorganic salts, such as sodium nitrate, and complex organic materials of the type commonly used in the fermentation industry, e.g., corn steep liquor, corn distillers dried solubles, ground-nut meal, soya-bean meal, hydrolyzate of casein and peptone. We have found that corn steep liquor is a very good source of nitrogen, the preferred amount being in the range 4.5 percent w/v to 7.5 percent w/v.

An assimilable source of carbon and energy is also provided in the nutrient medium in addition to such sources as may be present in corn steep liquor or other material which is provided as sole source or organic nitrogen. Carbohydrates are suitable sources of carbon and energy, e.g., glucose, lactose, maltose and sucrose. Certain animal and vegetable oils such as lard oil and maize oil may with advantage be added to the nutrient medium and also serve as sources of carbon and energy.

It may be necessary to add certain inorganic salts to the nutrient medium, e.g., magnesium sulphate, ferrous sulphate, potassium phosphate and potassium chloride, particularly when the nitrogen source provided is an inorganic one such as sodium nitrate. When a complex organic material is used as source of nitrogen the necessary chemical elements may also be present in this material. However, we have found that when corn steep liquor is used as the nitrogen source in the final fermentation medium, then additional antibiotic is produced if the medium is supplemented with up to 0.5 percent w/v of potassium chloride.

It is preferable to adjust the pH of the medium before sterilization to such a value that the pH after sterilization and inoculation at the start of the fermentation lies within the range 5.5 to 6.0.

The conditions of airflow and agitation during the fermentation must be such as to provide adequate aeration of the culture during the final fermentation and the required conditions vary according to the design of the fermenter used. In general, high rates of agitation are necessary to obtain the highest yields of antibiotic; it is preferable to start the fermentation at a low rate of airflow which is increased as the fermentation proceeds. Various antifoam agents may be added to prevent excessive foam during the fermentation, e.g., octadecanol and "Hodag MF." The fermentation may be carried out at a temperature between 20° and 30° C., a temperature between 24° and 26° C. being preferred. The fermentation is harvested when the antibiotic titre, as given by bioassay has risen to a maximum, usually in about 4 to 5 days.

To assay the antibiotic in the fermentation broth whole broth samples were extracted with Aromasol L, a hydrocarbon solvent containing 80 percent toluene. Filter paper disc bioassays of the extracts were then carried out, using a sensitive strain of the filamentous mold *Paecilomyces varioti* as test organism, against standards of the purified antibiotic dissolved in Aromasol L.

Extraction

Fermentation brews contain about 2.5 percent w/v solids, the activity being present in both the culture fluid and the mycelial solids. Many non water-miscible solvents can be used for the recovery of the antibiotic of the present invention. Hydrocarbon solvents are preferred for the isolation of the compound because they extract fewer impurities with the active compound. Commercial hydrocarbon solvents are preferred because of their satisfactory extraction efficiency and cheapness.

If the pH of the system is adjusted to 4.0 to 5.0 using 25 percent sulphuric acid, only about 10 percent of the antifungal activity remains in solution in the culture fluid: the remainder of the activity is filtered off together with the mycelial solids. The usual extraction method is to take the solids from the filtration stage and extract them with a hydrocarbon solvent. The compound is then precipitated by concentrating this extract in vacuo. The product can be recrystallized from benzene and petroleum ether and is obtained in chromatographically pure form.

PHYSICAL AND CHEMICAL PROPERTIES

The antibiotic of the present invention is a pale yellow microcrystalline solid of low density possessing no optical activity and having a melting point of 212° C. No detectable loss in biological activity is observed if solutions are stored for 1 hour in the pH range 2 to 13; similarly no loss is observed if the solid is maintained at 150° C. for 1 hour. It sublimes at 150° to 160° C. (4 mm. Hg) and this is an effective purification technique.

The antibiotic is almost insoluble in water at neutral pH: solubility $\simeq 8$ µg./ml. at ambient temperature. It is somewhat soluble in ethanol ($\simeq 100$ µg./ml.), and fairly soluble in chloroform ($\simeq 25$ mg./ml.) and dimethylacetamide ($\simeq 35$ mg./ml.). The compound is sparingly soluble in paraffinic solvents, and this property is of great value in the extraction procedure. The compound is soluble in water at alkaline pH and fairly concentrated solutions can be obtained. It is also soluble in concentrated sulphuric acid and can be recovered unchanged by diluting the solution with water. If a solution in sulphuric acid is warmed for a few minutes a deep red coloration is obtained.

A series of spot tests were carried out on the antibiotic, the results of which are shown in table I:

TABLE I

| Test | Result |
| --- | --- |
| Alkaline permanganate | + |
| Permanganate/bromophenol blue | + |
| Diazotised p-nitroaniline | + |
| Alcoholic ferric chloride | + |
| Bromine/fluorescein | + |
| Gibbs | + |
| Ninhydrin | − |
| Tollen's (Zaffaroni) | − |
| Phosphomolybdic acid | − |
| Phosphoric acid | − |
| Millon's | − |
| Zimmermann | − |
| Dragendorff | − |
| Carr-Price | − |
| Molisch | − |
| Silver nitrate/pyrogallol | − |
| Bromophenol blue/citric acid | − |
| Brady | − |

The tests indicate the general unreactive nature of the antibiotic and could suggest that it is a phenolic compound with weak reducing properties and a degree of unsaturation.

The essential features of the determination of the structure of the antibiotic as 3'-chloro 5:2'-dihydroxy 3:7:8-trimethoxy flavone (I) are as follows:

The formula $C_{18}H_{15}ClO_7$ as determined by mass spectroscopy requires: C 57.07 percent; H 3.99 percent; Cl 9.36 percent OMe (three groups) 24.55 percent OH (two groups) 8.98 percent. Found: C 57.20 percent; H 3.88 percent; Cl 8.93 percent; OMe 24.78 percent; OH 7.82 percent. The n.m.r. spectrum showed three methoxy groups, two hydroxy groups and one single and three coupled aromatic protons. The u.v. spectrum in ethanol gave λmax.(log ε); 266 mμ (4.44) 305 (shoulder) (3.85) and 350 (3.85). The i.r. spectrum in chloroform gave $\gamma_{C=O}$, $1,656\ cm.^{-1}$.

The diacetate of the antibiotic is a pale yellow powder with no definite melting point. $C_{22}H_{19}ClO_9$ requires; C, 57.08 percent; H, 4.14 percent; Cl, 7.66 percent. Found: C, 57.09 percent; H, 4.08 percent; Cl, 7.70 percent. The n.m.r. spectrum showed three methoxy groups, two acetyl groups and one single and three coupled aromatic protons. The u.v. spectrum in ethanol gave λmax. (log ε): 256 mμ(4.40), 305 (4.02) and 318 (shoulder) (4.00). The i.r. spectrum in chloroform gave $\gamma_{C=O}$, $1,645\ cm.^{-1}$.

The dimethyl ether of the antibiotic is a white crystalline solid, melting point 114°–115° C. $C_{20}H_{19}ClO_7$ requires, C 59.04 percent; H. 4.70 percent; Cl, 8.71 percent. Found: C 59.28 percent; H, 4.91 percent; Cl, 8.44 percent. The n.m.r. spectrum showed five methoxy groups and one single and three coupled aromatic protons. The u.v. spectrum in ethanol gave λmax. (log ε); 258 mμ (4.19); 333 (3.94). The i.r. spectrum in chloroform gave $\gamma_{C=O}$, $1,637\ cm.^{-1}$.

Alkaline hydrolysis of the antibiotic gave 3-chloro salicylic acid and 4;5-dimethoxy resorcinol. Alkaline hydrolysis of its dimethyl ether gave 3-chloro 2-methoxy benzoic acid and 2-hydroxy ω;3;4;6 tetramethoxy acetophenone. The combination of these four products gives (I) as the only possible structure.

The bathochromic shift of the carbonyl wavelength by 10 to 20 cm.$^{-1}$ on acetylation or methylation is characteristic of 5-hydroxy flavones.

Reduction of the antibiotic with magnesium and hydrochloric acid gives a deep red color, characteristic of 3-oxygenated flavones.

BIOLOGICAL PROPERTIES

The activity of the antibiotic of the present invention against fungi in vitro is shown in table II.

TABLE II

| Fungus | Strains (BRL No.) | Minimum inhibitory concentration (mcg./ml.) |
| --- | --- | --- |
| Aspergillus amstelodami | 608 | 0.08 |
| Aspergillus fumigatus | 57 | 0.08 |
| Aspergillus fumigatus | 165 | 0.08 |
| Aspergillus fumigatus | 165 | 0.08 |
| Aspergillus fumigatus | 424 | 0.08 |
| Aspergillus fumigatus | 434 | 0.16 |
| Aspergillus fumigatus | 636 | 0.16 |
| Aspergillus fumigatus | 724 | 0.08 |
| Aspergillus fumigatus (var. helvolus) | 714 | 0.63 |
| Aspergillus ochraceous | 708 | 0.16 |

The following examples illustrate the invention:

EXAMPLE 1

Five liters (1.) of seed medium were sterilized in a 10 l. fermenter. The composition of the seed medium was as follows:

| Constituent | Amount (g./l.) |
| --- | --- |
| Corn steep liquor (50% solids) | 76 |
| Chalk | 10 |
| Sucrose (brown sugar) | 20 |
| Maize oil | 2.5 |

The pH was adjusted to 5.8 with sodium hydroxide before sterilization. After cooling, the medium was inoculated with a spore suspension obtained from a slant of Aspergillus candidus BRL 274 (A.T.C.C. No. 20022) and incubated for 48 hours at 26° C. with an airflow of 5 l./min. and stirring at 500 r.p.m. using a 3.5-inch diameter vaned disc impeller. A 100 l. fermenter containing 75 l. of the same seed medium was sterilized at 120° C. for 40 minutes and then incubated with the contents of the first seed stage above. The second seed stage was then incubated at 26° C. for 30 hours with an airflow of 75 l./min. and stirring at 210 r.p.m. using a 7.5-inch diameter vaned disc impeller.

The final fermentation medium had the following composition:

| Constituent | Amount (g./l.) |
| --- | --- |
| Corn steep liquor (50% solids) | 60 |
| Chalk | 2 |
| Glucose monohydrate | 50 |
| Potassium chloride | 5 |
| Lard oil | 2.5 |

The pH was adjusted to 5.8 with sodium hydroxide before sterilization. Fifteen hundred l. of this medium were sterilized in a 2,000 l. fermenter. After cooling, the medium was inoculated with the contents of the second seed stage above and the fermentation was then incubated at 26° C. with airflow of 600 l./min. during the first 30 hours and 1,000 l./min. thereafter. The fermentation was stirred at 166 r.p.m. using two 19-inch vaned disc impellers. During the fermentation 50 ml. portions of an antifoam agent consisting of 2 percent octadecanol in lard oil containing 7.5 percent v/v of white mineral oil were added when necessary to suppress foam. The fermentation was harvested after 100 hours incubation, at which time the antibiotic titre had risen to 9.5 μg./ml.

One thousand six hundred and fifty 1. of whole brew after harvest were adjusted to pH 4.0 using 25 percent sulphuric acid. The solids were then removed using a rotary drum filter. One thousand four hundred and forty 1. of filtrate were discarded and the mycelial solids extracted with 200 1. SBP 6. (SBP 6 is a commercial hydrocarbon solvent produced by Shell-Mex Ltd.). After removing the solids from the SBP 6, they were extracted again with 200 1. Aromasol L (Aromasol L is a hydrocarbon solvent produced by Imperial Chemical Industries Ltd.). The SBP 6 extract was concentrated in vacuo to 1.6 l., and the solids thrown down were recrystallized from petroleum ether 100/120. A total of 5.05 g. of 3'-chloro 5:2'-dihydroxy 3:7:8-trimethoxy flavone were obtained. In the same way 0.95 g. of the product were obtained from the Aromasol extract.

EXAMPLE 2

The seed stages and final fermentation were carried out in exactly the same way as in example 1 except that the stirrer speed for the final fermentation was 182 r.p.m. The fermentation was harvested after 102 hours incubation, at which time the antibiotic titre had risen to 12 μg./ml.

One thousand and six hundred 1. of whole brew were adjusted to pH 5.0 using 25 percent sulphuric acid. After removing the mycelial solids by filtration they were extracted in two portions using 100 1. of SBP 6 for each. The first half was extracted at room temperature for 3 hours and the second half for the same time at 60° C. After the same isolation procedure outlined in example 1 2.9 g. of the pure compound were obtained from the extraction at ambient temperature and 3.1 g. from the extraction carried out at 60° C.

We claim:

1. A process for the production of the antibiotic

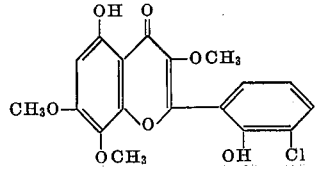

which comprises growing a strain of *Aspergillus candidus* selected from BRL 274 (ATCC 20022) and BRL 716 (ATCC 20023) or a mutant thereof under aerobic conditions in an aqueous nutrient solution containing inorganic salts and a source of carbon and of nitrogen until the nutrient solution exhibits a substantial antibiotic activity and thereafter isolating the antibiotic.

2. The process of claim 1 in which the antibiotic is isolated by extraction with a hydrocarbon solvent.

* * * * *